(12) United States Patent
Jeong

(10) Patent No.: US 10,743,233 B2
(45) Date of Patent: Aug. 11, 2020

(54) COMMUNICATION APPARATUS, METHOD OF CONTROLLING THE COMMUNICATION APPARATUS, AND AIR CONDITIONER HAVING THE COMMUNICATION APPARATUS

(71) Applicant: Samsung Electronics Co., Ltd., Suwon-si, Gyeonggi-do (KR)

(72) Inventor: Sang Jin Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/883,651

(22) Filed: Jan. 30, 2018

(65) Prior Publication Data

US 2018/0220351 A1     Aug. 2, 2018

(30) Foreign Application Priority Data

Jan. 31, 2017   (KR) .................. 10-2017-0013774

(51) Int. Cl.
  *H04W 40/04*   (2009.01)
  *H04B 7/15*    (2006.01)
  (Continued)

(52) U.S. Cl.
  CPC ............ *H04W 40/04* (2013.01); *H04B 7/15* (2013.01); *H04B 17/40* (2015.01);
  (Continued)

(58) Field of Classification Search
  CPC .......... G01N 23/04; G01T 1/026; H04N 5/32; H04B 17/40; H04B 7/15; H04L 41/0668; H04L 41/0681; H04L 67/12; H04W 40/04
  (Continued)

(56) References Cited

U.S. PATENT DOCUMENTS

2005/0278040 A1   12/2005   Itoh et al.
2006/0140123 A1   6/2006    Conner et al.
(Continued)

FOREIGN PATENT DOCUMENTS

JP   2004065705 A   3/2004
JP   2006038393 A   2/2006
(Continued)

OTHER PUBLICATIONS

International Search Report dated May 17, 2018 in connection with International Patent Application No. PCT/KR2018/001172.
(Continued)

*Primary Examiner* — Huy D Vu
*Assistant Examiner* — Nizam U Ahmed

(57) ABSTRACT

A communication, an air conditioner, and a method for controlling the communication apparatus are disclosed. The communication apparatus includes a communicator and a controller. The communicator is configured to receive a recognition signal from each of one or more other communication apparatuses. The communicator is also configured to transmit a generated first status message generated based on the recognition signal. The communicator is also configured to receive at least one second status message generated by the one or more other communication apparatuses. The controller is configured to generate the first status message based on the recognition signal received by the communicator. The controller is also configured to determine a repeat node by comparing the second status message with the first status message.

20 Claims, 14 Drawing Sheets

(51) Int. Cl.
  *H04B 17/40* (2015.01)
  *H04L 12/24* (2006.01)
  *H04L 29/08* (2006.01)
(52) U.S. Cl.
  CPC ...... *H04L 41/0668* (2013.01); *H04L 41/0681* (2013.01); *H04L 67/12* (2013.01)
(58) Field of Classification Search
  USPC .......................................................... 370/218
  See application file for complete search history.

(56) References Cited

U.S. PATENT DOCUMENTS

| | | | |
|---|---|---|---|
| 2007/0274338 A1 | 11/2007 | Binder | |
| 2015/0372897 A1 | 12/2015 | Han et al. | |
| 2016/0242028 A1* | 8/2016 | Cho | H04L 9/006 |
| 2017/0244472 A1* | 8/2017 | Saito | H04B 17/318 |

FOREIGN PATENT DOCUMENTS

| | | |
|---|---|---|
| JP | 2006207946 A | 8/2006 |
| JP | 2006207949 A | 8/2006 |
| JP | 2006210231 A | 8/2006 |
| JP | 2008101911 A | 5/2008 |
| JP | 2011003339 A | 2/2011 |
| JP | 2015227734 A | 12/2015 |
| JP | 2016528821 A | 9/2016 |
| KR | 10-2007-0019703 A | 2/2007 |
| KR | 10-2008-0040041 A | 5/2008 |
| KR | 10-2010-0009727 A | 1/2010 |
| KR | 10-2010-0023958 A | 3/2010 |
| KR | 10-2010-0023959 A | 3/2010 |
| KR | 10-2011-0053089 A | 5/2011 |
| KR | 10-2011-0102029 A | 9/2011 |
| KR | 10-2011-0102041 A | 9/2011 |
| KR | 10-2011-0102042 A | 9/2011 |
| KR | 10-2011-0103754 A | 9/2011 |
| KR | 10-2011-0103760 A | 9/2011 |
| KR | 10-2011-0108738 A | 10/2011 |
| KR | 10-2011-0108739 A | 10/2011 |
| KR | 10-2012-0085123 A | 7/2012 |
| KR | 10-2012-0085124 A | 7/2012 |
| KR | 10-1214490 B1 | 12/2012 |
| WO | 2016/063454 A1 | 4/2016 |

OTHER PUBLICATIONS

Supplementary European Search Report dated Nov. 13, 2019 in connection with European Patent Application No. 18 74 7446, 9 pages.

\* cited by examiner

| 10 | AIR CONDITIONER |
| 11 | OUTDOOR UNIT |
| 12 | INDOOR UNIT |
| 13 | COMMUNICATION APPARATUS |

FIG. 5

| M1 | M2 | M3 |
|---|---|---|
| ADDRESS OF EACH COMMUNICATION APPARATUS | NUMBER OF SIGNALS | COMMUNICATION STATUS INFORMATION |

| a | COMMUNICATION APPARATUS A |
| b | COMMUNICATION APPARATUS B |
| c | COMMUNICATION APPARATUS C |
| d | COMMUNICATION APPARATUS D |
| e | COMMUNICATION APPARATUS E |
| f | COMMUNICATION APPARATUS F |

FIG. 8

| M1 | M2 | M3 |
|---|---|---|
| ADDRESS OF EACH COMMUNICATION APPARATUS 00:00:00:10 | NUMBER OF SIGNALS | COMMUNICATION STATUS INFORMATION |

| M1 | M2 | M3 |
|---|---|---|
| ADDRESS OF EACH COMMUNICATION APPARATUS 00:00:00:01 | NUMBER OF SIGNALS | COMMUNICATION STATUS INFORMATION |

COMMUNICATION APPARATUS, METHOD OF CONTROLLING THE COMMUNICATION APPARATUS, AND AIR CONDITIONER HAVING THE COMMUNICATION APPARATUS

CROSS-REFERENCE TO RELATED APPLICATION AND CLAIM OF PRIORITY

This application claims priority to Korean Patent Application No. 10-2017-0013774, filed on Jan. 31, 2017, the disclosure of which is incorporated herein by reference.

TECHNICAL FIELD

Embodiments of the present disclosure relate to a communication apparatus, a method of controlling the communication apparatus, and an air conditioner having the communication apparatus, and more particularly, to a technique of determining a repeat node which allows a signal to be transmitted through an air conditioner network.

BACKGROUND

An outdoor unit and a plurality of indoor units constituting an air conditioner mostly communicate with each other through wired communication such as RS-485 communication. In such wired communication, a communication line has to be additionally provided between the outdoor unit and the indoor units, and a pipe configured to protect the line has to be installed together with the communication line.

In addition, when re-installing the air conditioner by using an existing refrigerant pipe, the line cannot be reused and re-installed.

In order to solve such problems, there has been an attempt to replace RS-485 communication with a pipe communication scheme. However, when the RS-485 communication is replaced with the pipe communication scheme, there is an issue about how to make communication.

A research on a technique about an implementation method such as ensuring communication reliability and address allocation according to pipe communication has been conducted. However, in practice, a communication signal has to be increased in order to ensure a communication distance, and an air conditioner standard (electromagnetic compatibility standard; EMC standard) may not be satisfied when the communication signal is increased, so that there has been a limit in applying the above implementation method to actual long-distance pipe communication.

SUMMARY

Therefore, it is an aspect of the present disclosure to provide a communication apparatus capable of implementing long-distance communication by determining a repeat node configured to ensure a communication distance on an air conditioner network provided as a pipe communication device, a method of controlling the communication apparatus, and an air conditioner having the communication apparatus.

Additional aspects of the disclosure will be set forth in part in the description which follows and, in part, will be obvious from the description, or may be learned by practice of the disclosure.

In accordance with one aspect of the present disclosure, a communication apparatus includes: a communicator configured to receive a recognition signal from each of one or more other communication apparatuses, transmit a first status message generated on the basis of the recognition signal, and receive at least one second status message generated by the one or more other communication apparatuses; and a controller configured to generate the first status message based on the recognition signal received by the communicator, and determine a repeat node by comparing the second status message with the first status message, wherein the first status message includes the number of the one or more other communication apparatuses recognized on the basis of the recognition signal, and a first parameter representing a communication status associated with the recognized one or more other communication apparatuses, and the second status message includes a number of one or more other different communication apparatuses recognized on the basis of other recognition signals, which are received by the one or more other communication apparatuses from each of the one or more other different communication apparatuses, and a second parameter representing a communication status associated with the recognized one or more other different communication apparatuses.

The controller may determine whether the communication apparatus is the repeat node by comparing the number of the one or more other communication apparatuses included in the first status message with the number of the one or more other different communication apparatuses included in the second status message.

The controller may determine whether the communication apparatus is the repeat node by comparing the first parameter included in the first status message with the second parameter included in the second status message.

The first status message may further include a network address of the communication apparatus, the second status message may further include a network address of the other communication apparatus, and the controller may determine whether the communication apparatus is the repeat node by comparing the network address of the communication apparatus included in the first status message with the network address of each of the one or more other communication apparatuses included in the second status message when the number of the one or more other communication apparatuses included in the first status message is equal to the number of the one or more other different communication apparatuses included in the second status message, and the first parameter is identical to the second parameter.

The communicator may transmit and receive data to and from a master communication apparatus configured to lead communication of the communication apparatus, and the controller may generate a notification message to transmit the notification message to the master communication apparatus when the communication apparatus is determined as the repeat node.

The master communication apparatus may confirm the communication apparatus as the repeat node when the notification message is received, may generate a confirmation message based on a fact that the communication apparatus is the repeat node, and may transmit the confirmation message to the one or more other communication apparatuses.

The communicator may receive data based on a user command determining the repeat node from the master communication apparatus.

The controller may determine whether the communication apparatus is the repeat node using the data based on the user command.

The master communication apparatus may transmit a master signal to the communicator when the communication apparatus is confirmed as the repeat node.

The controller may transfer the master signal received by the communicator to the one or more other communication apparatuses.

The controller may generate an error message when the communicator fails to receive the master signal from the master communication apparatus or fails to transfer the master signal to the one or more other communication apparatuses, and may transmit the error message to the master communication apparatus.

In accordance with one aspect of the present disclosure, a method of controlling a communication apparatus includes: receiving, by a communication apparatus, a recognition signal from each of one or more other communication apparatuses; generating a first status message based on the recognition signal; receiving at least one second status message generated by the one or more other communication apparatuses; and determining whether the communication apparatus is a repeat node by comparing the second status message with the first status message, wherein the first status message includes the number of the one or more other communication apparatuses recognized on the basis of the recognition signal, and a first parameter representing a communication status associated with the recognized one or more other communication apparatuses, and the second status message includes the number of one or more other different communication apparatuses recognized on the basis of other recognition signals, which are received by the one or more other communication apparatuses from each of the one or more other different communication apparatuses, and a second parameter representing a communication status associated with the recognized one or more other different communication apparatuses.

The determining of the repeat node may include determining whether the communication apparatus is the repeat node by comparing the number of the one or more other communication apparatuses included in the first status message with the number of the one or more other different communication apparatuses included in the second status message.

The determining of the repeat node may include determining whether the communication apparatus is the repeat node by comparing the first parameter included in the first status message with the second parameter included in the second status message.

The first status message may further include a network address of the communication apparatus, the second status message may further include a network address of the other communication apparatus, and the determining of the repeat node may include determining whether the communication apparatus is the repeat node by comparing the network address of the communication apparatus included in the first status message with the network address of the one or more other communication apparatuses included in the second status message when the number of the one or more other communication apparatuses included in the first status message is equal to the number of the one or more other different communication apparatuses included in the second status message, and the first parameter is identical to the second parameter.

In accordance with one aspect of the present disclosure, the method of controlling the communication apparatus may further include: transmitting and receiving data to and from a master communication apparatus configured to lead communication of the communication apparatus; and generating a notification message to transmit the notification message to the master communication apparatus when the communication apparatus is determined as the repeat node, wherein the master communication apparatus may confirm the communication apparatus as the repeat node when the notification message is received, may generate a confirmation message based on a fact that the communication apparatus is the repeat node, and may transmit the confirmation message to the one or more other communication apparatuses.

In accordance with one aspect of the present disclosure, the method of controlling the communication apparatus may further include receiving data based on a user command determining the repeat node from the master communication apparatus, wherein the determining of the repeat node may include determining whether the communication apparatus is the repeat node using the data based on the user command.

The master communication apparatus may transmit a master signal to the communicator when the communication apparatus is confirmed as the repeat node, and the method of controlling the communication apparatus may further include transferring the master signal received by the communicator to the one or more other communication apparatuses.

In accordance with one aspect of the present disclosure, the method of controlling the communication apparatus may further include generating an error message when the communicator fails to receive the master signal from the master communication apparatus or fails to transfer the master signal to the one or more other communication apparatuses, and transmitting the error message to the master communication apparatus.

In accordance with one aspect of the present disclosure, an air conditioner includes: a first communication apparatus configured to generate a first status message based on a plurality of first recognition signals received by the first communication apparatus to transmit the first status message; a second communication apparatus configured to determine whether the second communication apparatus is a repeat node by comparing the first status message transmitted by the first communication apparatus with a second status message generated on the basis of a plurality of second recognition signals received by the second communication apparatus; and a bus configured to transmit a signal between the first communication apparatus and the second communication apparatus, wherein the first status message includes the number of one or more other communication apparatuses recognized by the first communication apparatus based on the first recognition signal, and a first parameter representing a communication status associated with the recognized one or more other communication apparatuses, and the second status message includes the number of one or more other communication apparatuses recognized by the second communication apparatus based on other recognition signals, which are received from each of the one or more other communication apparatuses, and a second parameter representing a communication status associated with the recognized one or more other communication apparatuses.

The second communication apparatus may determine whether the second communication apparatus is the repeat node by comparing the number of the one or more other communication apparatuses included in the first status message with the number of the one or more other communication apparatuses included in the second status message.

The second communication apparatus may determine whether the second communication apparatus is the repeat node by comparing the first parameter included in the first status message with the second parameter included in the second status message.

The first status message may further include a network address of the first communication apparatus, the second status message may further include a network address of the second communication apparatus, and the second communication apparatus may determine whether the second communication apparatus is the repeat node by comparing the network address of the first communication apparatus with the network address of the second communication apparatus when the number of one or more other communication apparatuses included in the first status message is equal to the number of the one or more other communication apparatuses included in the second status message, and the first parameter is identical to the second parameter.

In accordance with one aspect of the present disclosure, the air conditioner may further include a master communication apparatus connected to the first communication apparatus and the second communication apparatus, wherein the bus may transfer a signal between the master communication apparatus, the first communication apparatus, and the second communication apparatus, the second communication apparatus may generate a notification message to transmit the notification message to the master communication apparatus when the second communication apparatus is determined as the repeat node, and the master communication apparatus may confirm the communication apparatus as the repeat node when the notification message is received, may generate a confirmation message based on a fact that the communication apparatus is the repeat node, and may transmit the confirmation message to the first communication apparatus.

The master communication apparatus may receive a user command determining the repeat node to transmit data based on the user command, and the second communication apparatus may determine whether the second communication apparatus is the repeat node using the data based on the user command.

The master communication apparatus may transmit a master signal to the second communication apparatus when the second communication apparatus is determined as the repeat node, and the second communication apparatus may receive the master signal to transmit the master signal to the first communication apparatus.

The master communication apparatus may output an error message when the second communication apparatus is determined as the repeat node and when the second communication apparatus fails to receive the master signal or fails to transfer a received master signal to the first communication apparatus.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a view illustrating a configuration of a status message in accordance with one embodiment of the present disclosure;

FIG. 8 illustrates a view for describing an operation for determining a repeat node based on a network address of a communication apparatus in accordance with one embodiment of the present disclosure;

DETAILED DESCRIPTION

Figure 1:
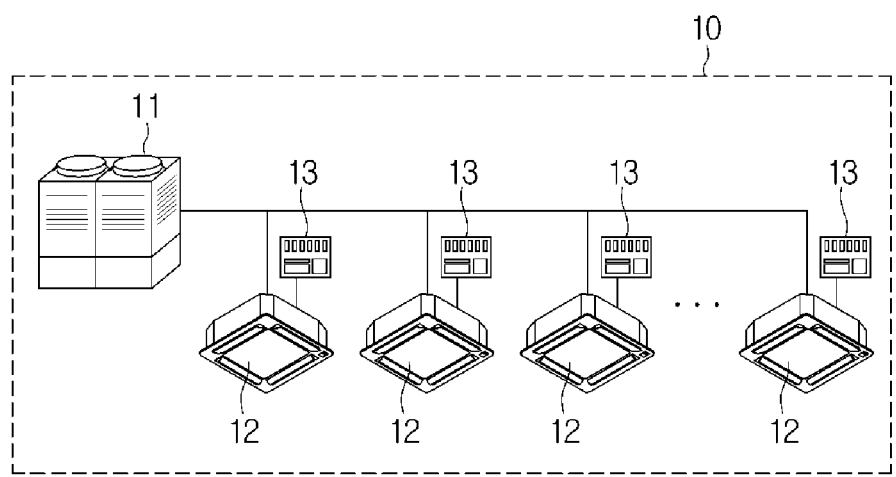
FIG. 1 illustrates a conceptual view illustrating an air conditioner in accordance with one embodiment of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals refer to like elements throughout the specification. This specification does not describe all the elements of the embodiments, and the general contents of the related art or duplicative contents in the embodiments will be omitted. The terms "unit," "module," "member," and "block" used herein may be implemented by hardware or software. It is also possible that a plurality of units, modules, members, and blocks are implemented as one element, or one unit, module, member, or block includes a plurality of elements in accordance with the embodiments.

Throughout the specification, when an element is referred to as being "connected" to another element, it may be directly connected or indirectly connected to another element. The indirect connection includes a connection through a wireless communication network.

In addition, when some part "includes" some elements, unless explicitly described to the contrary, it means that other elements may be further included but not excluded.

Throughout the specification, when a member is referred to as being located "on" another member, a third member may be present between the two members in addition to the two members being in contact.

The terms such as "first" or "second" may be used to distinguish one element from another, but the elements are not limited by the terms.

Singular forms are intended to include plural forms unless the context clearly indicates otherwise.

Reference numerals of operations are used for convenience of description, and the reference numerals do not indicate the order of the operations. The operations may be performed in an order that is different from the described order unless a specific order is clearly described in context.

Hereinafter, an operation principle and embodiments of the present disclosure will be described with reference to the accompanying drawings.

FIG. 1 illustrates a conceptual view illustrating an air conditioner in accordance with one embodiment of the present disclosure.

As shown in FIG. 1, an air conditioner 10 in accordance with one embodiment of the present disclosure includes a plurality of indoor units 12, an outdoor unit 11, and a bus.

The air conditioner 10 is an air conditioning facility including at least one indoor unit 12 and at least one outdoor unit 11 commonly connected with the indoor units 12 to satisfy a cooling/heating capacity of a building. Individual control of inputting an operation command directly to the outdoor unit 11 and the indoor unit 12 arranged in each room may be performed, and operation of the indoor unit 12 and the outdoor unit 11 which are communicatively connected may be controlled through a controller at one place without accessing the indoor unit 12 in each room. In this case, a plurality of outdoor units 11 and indoor units 12 may be provided. Each of a master communication apparatus provided in the outdoor unit 11 and a communication apparatus of the indoor unit 12 have a fixed or floating internet protocol (IP).

The master communication apparatus provided in the outdoor unit 11 is communicatively connected through a communication cable in a communication scheme, such as an RS-485 scheme, to monitor a status of each indoor unit 12 and the like and to control the operation thereof integrally or individually. In addition, the indoor unit 12 may include the communication apparatus which will be described below. The master communication apparatus distinguishes each indoor unit 12 through an IP address set for each indoor unit 12. In addition, the master communication apparatus has a fixed or floating IP. In particular, the master communication collects operation information and failure information of each outdoor unit and indoor unit. The operation information may be classified into operation information of the outdoor unit 11 and operation information of the indoor unit 12. The operation information of the outdoor unit 11 includes a defrosting state, a condenser temperature, a compressor discharge temperature, an evaporator outlet temperature, an oil temperature, a compressor suction temperature, a pressure of a low-pressure pipe, a pressure of a high-pressure pipe, an outdoor temperature, an opening degree of an outdoor electronic expansion valve, and a rotational speed of an outdoor fan. The information of the indoor unit 12 includes a power state of the indoor unit 12, a set temperature, an indoor temperature, an indoor heat exchanger temperature, an indoor pipe outlet temperature, a capability code of the indoor unit 12, an opening degree of an indoor electronic expansion valve, and a rotational speed of an indoor fan. In addition, the failure information includes various failure codes related to a compressor failure, a compressor operation failure, an outdoor fan failure, an outdoor fan operation failure, a temperature sensor failure in the indoor unit 12, an indoor fan failure, an indoor fan operation failure, etc.

In addition, the master communication apparatus may include a database configured to periodically receive and store the operation information and the failure information of each indoor unit 12.

Figure 2:
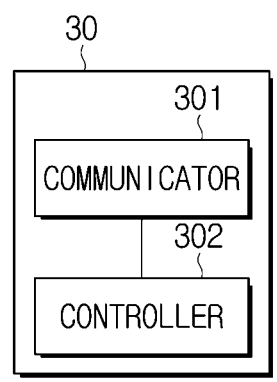
FIG. 2 illustrates a control block diagram illustrating a communication apparatus in accordance with one embodiment of the present disclosure.

FIG. 2 illustrates a control block diagram illustrating a communication apparatus in accordance with one embodiment of the present disclosure.

Referring to FIG. 2, a communication apparatus 30 in accordance with one embodiment may include a communicator 301 and a controller 302.

The communicator 301 may receive various signals. In detail, the communicator 301 may receive recognition signals from other communication apparatuses, and may receive messages transmitted from other communication apparatuses. In addition, as will be described below, the communicator 301 may receive a signal from the master communication apparatus to transfer the signal to the controller 302. In addition, the communicator 301 may include various wired communication modules such as a local area network (LAN) module, a wide area network (WAN) module, or a value added network (VAN) module, and various cable communication modules such as a Universal Serial Bus (USB) module, a high definition multimedia interface (HDMI) module, a digital visual interface (DVI) module, an RS-232 module, an RS-485 module, a power line communication module, or a plain old telephone service (POTS)

module. The detailed operation of the communication apparatus 30 provided with the communicator 301 will be described below.

The controller 302 may generate a first status message based on the recognition signal received by the communicator 301 to recognize other communication apparatuses. The first status message is a message used to determine whether the corresponding communication apparatus is able to serve as a repeat node. Meanwhile, other communication apparatuses may have a controller. Hereinafter, a status message generated and transmitted by other communication apparatuses is described as a second status message. In addition, the controller 302 may compare the first status message with the second status message to determine whether the corresponding communication apparatus is able to serve as the repeat node, and may transmit a notification message or the like to the master communication apparatus. The status message generated by the controller 302 and a specific operation of determining the communication apparatus as the repeat node will be described in detail below.

In addition, the controller 302 may be implemented as a memory (not shown) configured to store data of an algorithm for controlling operation of components or a program reproducing the algorithm, and a processor (not shown) configured to perform the above operation using the data stored in the memory. In this case, the memory and the processor may be implemented as separate chips. Alternatively, the memory and the processor may be implemented as a single chip.

Figure 3:
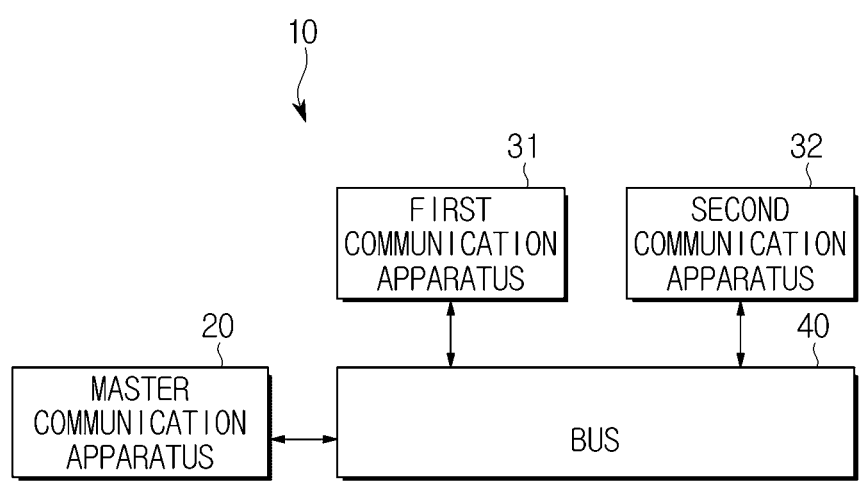
FIG. 3 illustrates a control block diagram illustrating the air conditioner in accordance with one embodiment of the present disclosure.

FIG. 3 illustrates a control block diagram illustrating the air conditioner in accordance with one embodiment of the present disclosure.

Referring to FIG. 3, the air conditioner may include a master communication apparatus 20, a first communication apparatus 31, a second communication apparatus 32, and a bus.

The first communication apparatus 31 and the second communication apparatus 32 are network communication apparatuses configured by a communication module provided in an indoor unit. The expressions such as "first" and "second" are ordinal numbers for distinguishing communication apparatuses, and do not indicate an operation order or priority of the communication apparatuses.

The first communication apparatus 31 may receive the recognition signal from the indoor unit provided with the communication apparatus, which may be detected by the first communication apparatus 31. The first communication apparatus 31 may obtain the number of indoor units which may be detected by the first communication apparatus 31 based on the number of the received recognition signals. For example, when the number of recognition signals received by the first communication apparatus 31 is three, the number of the indoor units which may be identified by the first communication apparatus 31 may be determined to be three. In addition, the first communication apparatus 31 may determine a communication status of each of the received recognition signals, and may obtain intensity difference information of the recognition signals. The first communication apparatus 31 may generate a status message including the number of signals which may be detected by the first communication apparatus 31, that is, the number of the indoor units, and the communication status of the signals, and the first communication apparatus 31 may transmit the status message to the second communication apparatus 32.

Similar to the first communication apparatus 31, the second communication apparatus 32 may obtain the number of the indoor units which may be detected by the second communication apparatus 32, may obtain the communication status and the intensity difference information of the signals received by the second communication apparatus 32, and may generate a status message including the communication status and the intensity difference information. In addition, the second communication apparatus 32 compares the message transmitted by the first communication apparatus 31 with the message generated by the second communication apparatus 32 to determine whether the second communication apparatus 32 is a repeat node. As will be described below, the repeat node refers to a node configured to receive a signal from the master communication apparatus 20 to transfer the signal to each communication apparatus in the case of having difficulty in smoothly transmitting the signal due to a long distance on a network when the master communication apparatus 20 transmits the signal to the first communication apparatus 31 or the second communication apparatus 32. For example, when the number of the indoor units detected by the first communication apparatus 31 is three, and the number of the indoor units detected by the second communication apparatus 32 is four, the second communication apparatus 32 detects more indoor units, so that the second communication apparatus 32 may be determined as being more suitable for transmitting the signal of the master communication apparatus 20, and therefore, the second communication apparatus 32 may serve as the repeat node. However, when the number of the indoor units detected by the first communication apparatus 31 is equal to the number of the indoor units detected by the second communication apparatus 32, since the repeat node may not be determined using only such information, the repeat node may be determined based on communication status information and the intensity difference information of the signal received by each communication apparatus. When the second communication apparatus 32 is determined as the repeat node based on the above-described operation, the second communication apparatus 32 may transmit a notification message to the master communication apparatus 20 informing that the second communication apparatus 32 is the repeat node. The above-described operation will be described in detail below.

The master communication apparatus 20 may be connected to the first communication apparatus 31 and the second communication apparatus 32, and may control the indoor unit provided with each communication apparatus. The master communication apparatus 20 may receive the notification message transmitted by the communication apparatus determined as the repeat node. The master communication apparatus 20 that has received the notification message may generate a confirmation message informing other communication apparatuses that the corresponding communication apparatus serves as the repeat node, and may transmit the message. When the master communication apparatus 20 receives the notification message and transmits a determination message based on the notification message, each communication apparatus which is not the repeat node may receive the signal directly from the master communication apparatus 20, and may receive the signal from the communication apparatus confirmed as the repeat node. That is, in the case of a communication apparatus in which the master communication apparatus 20 is difficult to directly transmit a signal due to a long network distance, when the master communication apparatus 20 transmits the master signal to the repeat node, the repeat node may transmit the master signal to the corresponding communication apparatus. In the above example, since the second communication apparatus 32 is determined as the repeat node, the master communication apparatus 20 may transmit the master signal to the second communication apparatus 32, and the second communication apparatus 32 may transmit the master signal to the first communication apparatus 31.

At least one component may be added or removed corresponding to performance of components of the system shown in FIG. 3. In addition, it will be readily understood by those skilled in the art that mutual positions of the components may be changed corresponding to the performance or a structure of the system.

The bus 40 may be connected to the master communication apparatus 20, the first communication apparatus 31, and the second communication apparatus 32 to mediate communication therebetween. The bus 40 may be implemented by various wired communication modules such as a LAN module, a WAN module, or a VAN module, as well as a USB module, a HDMI module, DVI, an RS-232 module, a power line communication module, a POTS module, etc.

In addition, in accordance with one embodiment, the bus 40 may be provided by the pipe communication device.

Meanwhile, each of the components shown in FIGS. 2 and 3 refers to software and/or a hardware component such as a field programmable gate array (FPGA) and an application specific integrated circuit (ASIC).

Figure 4:
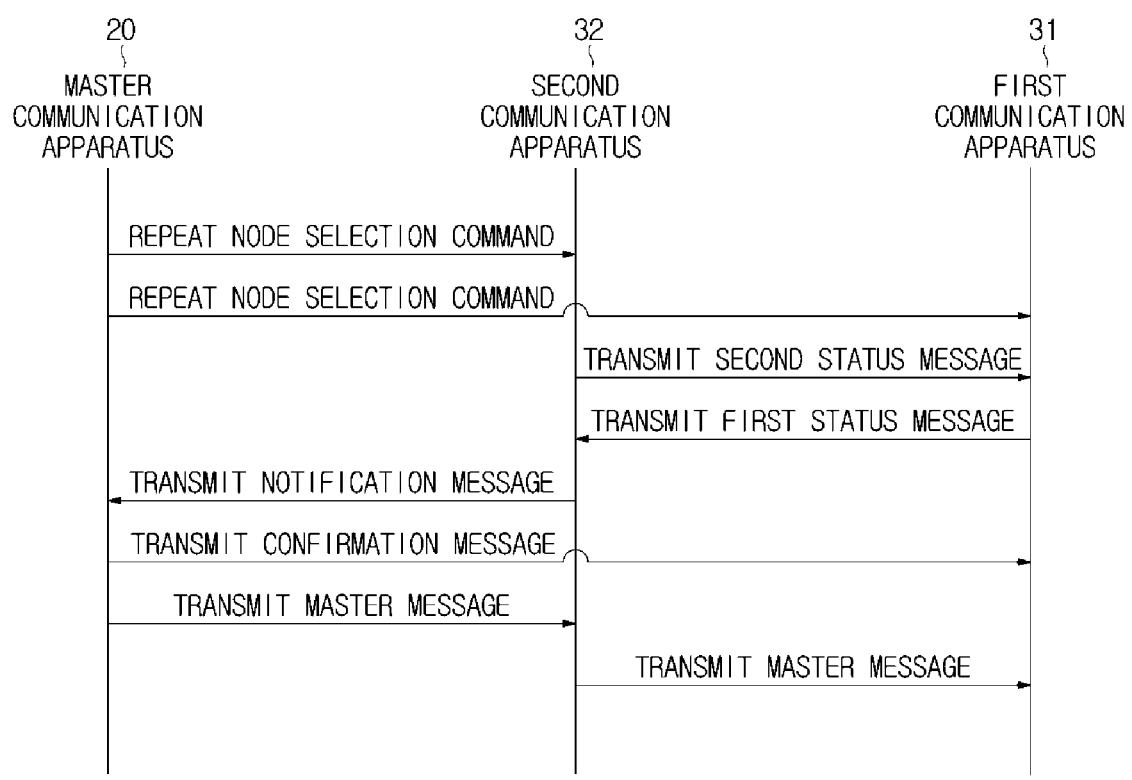
FIG. 4 illustrates a control flowchart illustrating the air conditioner in accordance with one embodiment of the present disclosure.

FIG. 4 illustrates a control flowchart illustrating the air conditioner in accordance with one embodiment of the present disclosure.

Referring to FIG. 4, an operation flow of the components of the above-described air conditioner is shown. As described above, the master communication apparatus 20 may communicate with the first communication apparatus 31 and the second communication apparatus 32 via the bus. When the air conditioner is activated, the master communication apparatus 20 transmits a message configured to select a repeat node to each communication apparatus. Each communication apparatus that has received the message transmitted by the master communication apparatus 20 to select the repeat node may obtain the number of recognition signals and an intensity difference of the signals received by the corresponding communication apparatus. That is, the first communication apparatus 31 obtains the number of the signals received by the first communication apparatus 31, and may obtain the intensity difference and the communication status information of the signals. The second communication apparatus 32 may perform the same operation as the first communication apparatus 31 corresponding to the second communication apparatus 32. According to the above operation, the first communication apparatus 31 and the second communication apparatus 32 may generate a status message including the number of the signals and the intensity difference information of the signals received by each communication apparatus. The detailed description of the status message will be described below.

The first status message and the second status message, which are generated as described above, are transmitted and received by the first communication apparatus 31 and the second communication apparatus 32 via the bus, and each communication apparatus may compare the status messages.

In FIG. 4, when the number of signals received by the second communication apparatus 32 is greater than the number of signals received by the first communication apparatus 31, or the intensity difference between the received signals is small, the second communication apparatus 32 is determined as the repeat node. When the second communication apparatus 32 is determined as the repeat node, the second communication apparatus 32 may transmit a notification message to the master communication apparatus 20. The master communication apparatus 20 may receive the notification message transmitted by the second communication apparatus 32 and confirm the second communication apparatus 32 as the repeat node. When the master communication apparatus 20 confirms the second communication apparatus 32 as the repeat node, a confirmation message containing information that the second communication apparatus 32 is serving as the repeat node may be transmitted to other communication apparatuses to notify other communication apparatuses of the second communication apparatus 32 serving as the repeat node. In FIG. 4, the second communication apparatus 32 is determined as the repeat node, so that the master communication apparatus 20 transmits the determination message to the first communication apparatus 31 to notify that the second communication apparatus 32 is the repeat node.

The setting of the repeat node in the air conditioner is completed through the above operation, so that when the master communication apparatus 20 transmits the master signal configured to control each communication apparatus to the second communication apparatus 32, the second communication apparatus 32 transmits the master signal to the first communication apparatus 31, thereby controlling an entire air conditioner.

FIG. 5 illustrates a view illustrating a configuration of a status message in accordance with one embodiment of the present disclosure.

Referring to FIG. 5, the status message includes an address M1 of each communication apparatus, a number of signals M2 of other communication apparatuses recognized by the corresponding communication apparatus, and communication status information M3 associated with other communication apparatuses.

As described above, each communication apparatus may be implemented by a communication module provided in each indoor unit. The address M1 of each communication apparatus is an address of the communication apparatus on the network, and may include an address of a data link layer, an address of a network layer, an address of a transport layer, and an address of a session layer. That is, each communication apparatus may be set with a media access control (MAC) address, an IP address, a transmission control protocol (TCP) address, or a TCP/IP address. For example, the MAC address of the first communication apparatus may be "00:00:00:00:10," and the MAC address of the second communication apparatus may be "00:00:00:00:01."

The "number of signals M2 of other communication apparatus recognized by the corresponding communication apparatus" refers to the number of communication apparatuses which may be recognized by each communication apparatus. Each communication apparatus may recognize a different number of communication apparatuses depending on a location of the network, and each communication apparatus may generate a status message on the basis of the number of other recognized communication apparatuses. For example, when the number of communication apparatuses recognized by the first communication apparatus is five, information of "5" may be attached to a corresponding position of the status message.

The "communication status information M3 associated with other communication apparatuses" is information related to the intensity difference of a plurality of signals received by each communication apparatus. For example, when the first communication apparatus receives a signal a, a signal b, and a signal c, relative intensity of the signal a is 10, relative intensity of the signal b is 2, and relative intensity of the signal c is 5, the first communication apparatus may attach 8, which is a difference between the signal a and the signal c and the greatest difference among the intensity differences of the signals, to "intensity difference information of the signal received from other communication apparatuses." In addition, the "communication status information M3 associated with other communication apparatuses" may be expressed and attached as a parameter. In accordance with one embodiment, the first communication apparatus may generate a first parameter and the second communication apparatus may generate a second parameter. The detailed operations related to the communication status information and the parameters will be described below.

Through the above-described operation, the first communication apparatus may generate the first status message, and the second communication apparatus may generate the second status message. In addition, in accordance with one embodiment of the present disclosure, the second communication apparatus may receive the first status message generated by the first communication apparatus, and may determine whether the second communication apparatus is the repeat node by comparing the first status message with the second status message. Determining whether the second communication apparatus is the repeat node may be performed on the basis of the "number of signals N of other communication apparatuses recognized by the corresponding communication apparatus" and the "communication status information associated with other communication apparatuses," and the detailed description related thereto will be described below.

Figure 6A:
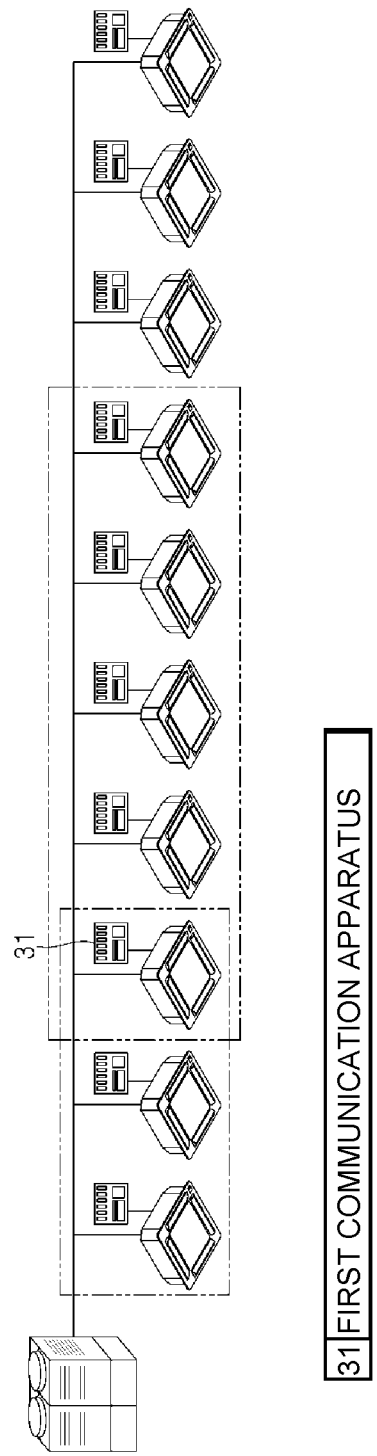
FIGS. 6A and 6B illustrate views for describing an operation for determining the number of signals of other communication apparatuses recognized by a corresponding communication apparatus in accordance with one embodiment of the present disclosure.
Figure 6B:
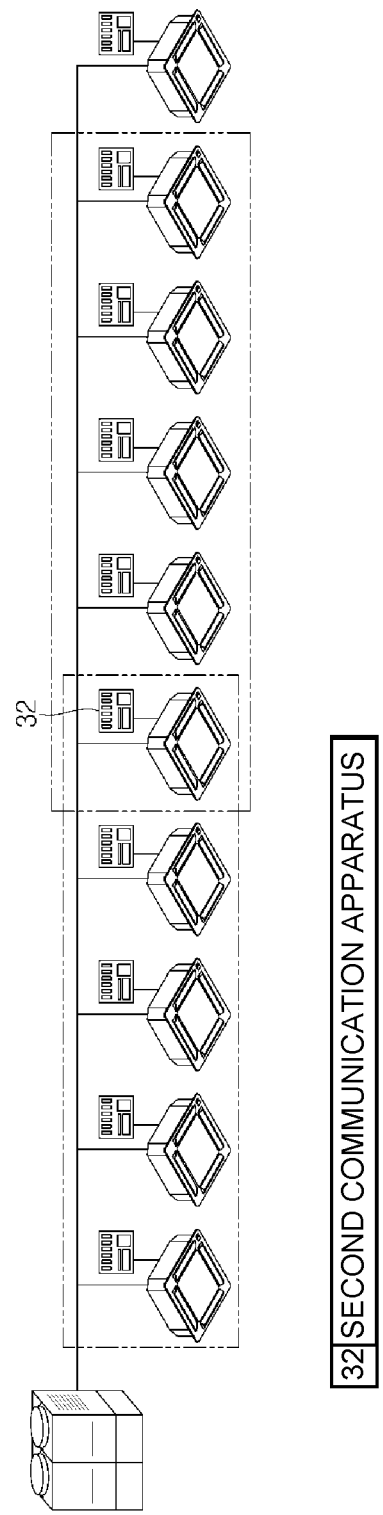

FIGS. 6A and 6B illustrate views for describing an operation for determining the number of signals of other communication apparatuses recognized by a corresponding communication apparatus in accordance with one embodiment of the present disclosure.

The communication apparatus shown in FIGS. 6A and 6B may detect the signals of other communication apparatuses located within a predetermined distance based on a location of the communication apparatus on the network.

FIG. 6A is a view for describing an operation in which the first communication apparatus 31 detects the signals of other communication apparatuses, and FIG. 6B is a view for describing an operation in which the second communication apparatus 32 detects the signals of other communication apparatuses.

Referring to FIG. 6A, the first communication apparatus 31 may detect a signal of a communication apparatus within a predetermined distance based on a location of the first communication apparatus 31 on the network. In FIG. 6A, the first communication apparatus 31 may detect a signal of a communication apparatus within four units based on a network address of the first communication apparatus 31. The first communication apparatus 31 is located in a third location from the beginning of the network. Two communication apparatuses located before the first communication apparatus 31 may be detected by the first communication apparatus 31, and four communication apparatuses located behind the first communication apparatus 31 may also be detected by the first communication apparatus 31. Therefore, the first communication apparatus 31 may detect a total of six communication apparatuses.

Referring to FIG. 6B, the second communication apparatus 32 may detect a signal of a communication apparatus within a predetermined distance based on a location of the second communication apparatus 32 on the network. In FIG. 6B, the second communication apparatus 32 may detect a signal of a communication apparatus within four units based on a network address of the second communication apparatus 32. The second communication apparatus 32 is located in a fifth location from the front on the network, the second communication apparatus 32 has the same specifications as the above-described first communication apparatus 31, and four communication apparatuses located before the second communication apparatus 32 and four communication apparatuses located behind the second communication apparatus 32 may be detected. Therefore, the second communication apparatus 32 may detect a total of eight communication apparatuses.

The first communication apparatus 31 has detected the total of six communication apparatuses, and the second communication apparatus 32 has detected the total of eight communication apparatuses. Each communication apparatus may generate a status message on the basis of the number of communication apparatuses which have been detected by each communication apparatus as described above to transmit and receive the status message. In accordance with the embodiment shown in FIG. 6, when the first communication apparatus 31 receives the second status message generated by the second communication apparatus 32, the number of communication apparatuses detected by the second communication apparatus 32 is eight, and the number of the communication apparatuses detected by the first communication apparatus 31 is six, so that the first communication apparatus 31 does not determine that the first communication apparatus 31 is the repeat node.

Meanwhile, when the second communication apparatus 32 receives the first status message generated by the first communication apparatus 31, the number of communication apparatuses detected by the first communication apparatus is six, and the number of communication apparatuses detected by the second communication apparatus 32 is eight, so the second communication apparatus 32 determines that the second communication apparatus 32 is the repeat node. Although an embodiment in which the number of communication apparatuses detected by the first communication apparatus 31 is equal to the number of communication apparatuses detected by the second communication apparatus 32 is not shown in FIGS. 6A and 6B, when the number of communication apparatuses detected by the first communication apparatus 31 is identical to the number of communication apparatuses detected by the second communication apparatus 32, the repeat node is determined according to the information based on the intensity difference of the signal received by each communication apparatus as will be described below.

Figure 7A:
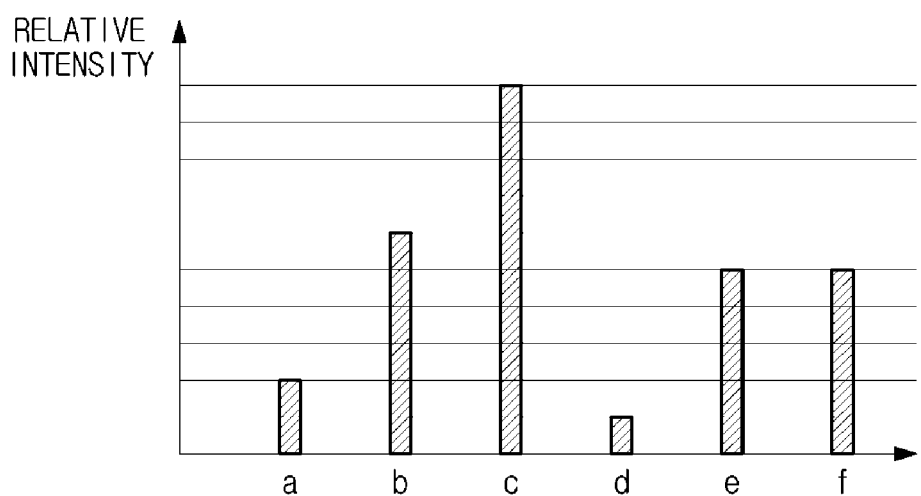
FIGS. 7A and 7B illustrate graphs for describing an operation in which a corresponding communication apparatus determines a communication status associated with other communication apparatuses in accordance with one embodiment of the present disclosure.
Figure 7B:
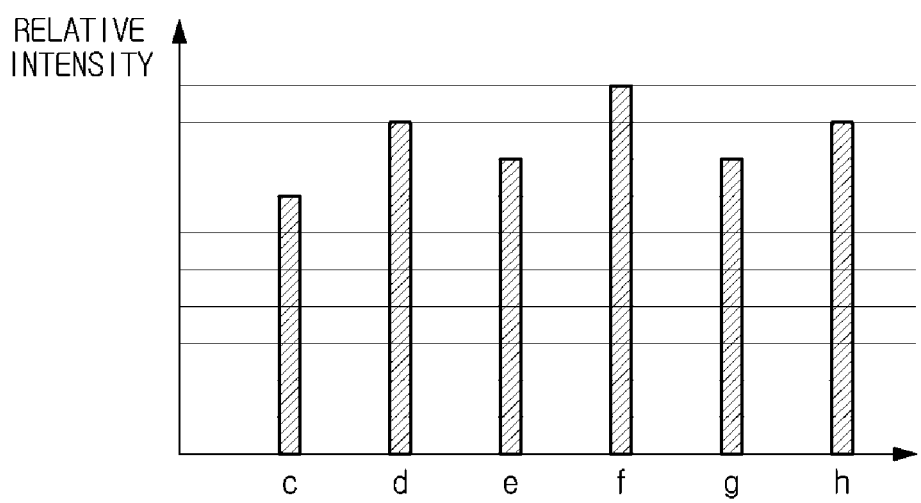

FIGS. 7A and 7B illustrate graphs for describing an operation in which a corresponding communication apparatus determines a communication status associated with other communication apparatuses in accordance with one embodiment of the present disclosure.

The operations described with reference to FIGS. 7A and 7B, which are views for describing an operation when each communication apparatus receives the same number of communication apparatus signals, are different from the operations of FIGS. 6A and 6B. In accordance with the embodiment shown in FIGS. 7A and 7B, each communication apparatus detects six communication apparatus signals.

FIG. 7A is a graph for describing an operation of obtaining an intensity difference of signals received by the first communication apparatus, and FIG. 7B is a graph for describing an operation of obtaining an intensity difference of signals received by the second communication apparatus.

In the graph shown in FIG. 7A, the horizontal axis indicates each communication apparatus that has transmitted the signal received by the first communication apparatus, and the vertical axis indicates relative intensity of the signal transmitted by each communication apparatus. Information on the relative intensity of the signal transmitted by each communication apparatus may be obtained in various ways. In accordance with one embodiment, the first communication apparatus may obtain the intensity difference of the signals by the following equation.

$$D1 = Sl - Ss \qquad \text{Equation 1}$$

Referring to Equation 1, D1 denotes information on an intensity difference of the signals received by the first communication apparatus, Sl denotes relative intensity of a signal having the greatest relative intensity among the signals received by the first communication apparatus, and Ss denotes intensity of a signal having the weakest relative intensity among the signals received by the first communication apparatus. The first communication apparatus may obtain a difference between the intensity of the signal having the weakest intensity and the intensity of the signal having the greatest intensity among the signals received by the first communication apparatus. In the graph shown in FIG. 7A, the signal having the greatest relative intensity is a signal received from a communication apparatus c, and the signal having the weakest relative intensity is a signal received from a communication apparatus d. A value of "9" may be obtained as D1 from the difference between the relative intensity of the communication apparatus c and the relative intensity of the communication apparatus d.

In addition, in accordance with another embodiment, the first communication apparatus may obtain intensity information by the following equation.

$$D2 = \sum_{n=1}^{k-1} d_n \qquad \text{Equation 2}$$

Referring to Equation 2, D2 denotes intensity difference information obtained by another embodiment, and d denotes difference values of other signals based on a signal having the greatest intensity among the signals received by the first communication apparatus. In addition, K denotes the number of communication apparatuses detected by the first communication apparatus.

In FIG. 7A, since the signal transmitted by the communication apparatus c is the signal having the greatest intensity, the first communication apparatus may perform calculation based on the signal transmitted by the communication apparatus c. A signal difference between a communication apparatus a and the communication apparatus c is 8, a signal difference between a communication apparatus b and the communication apparatus c is 4, a signal difference between the communication apparatus d and the communication apparatus c is 9, a signal difference between a communication apparatus e and the communication apparatus c is 5, and a signal difference between a communication apparatus f and the communication apparatus c is 5, so that a total of the differences corresponds to "31."

Referring to FIG. 7B, the second communication apparatus has received six communication apparatus signals, and in accordance with one embodiment, the second communication apparatus may receive signals of communication apparatuses c to h.

In the graph shown in FIG. 7B, the horizontal axis indicates each communication apparatus that has transmitted the signal received by the second communication apparatus, and the vertical axis indicates the relative intensity of the signal transmitted by each communication apparatus.

When the intensity difference information of the signal received by the second communication apparatus is obtained based on Equation 1, the signal having the greatest relative intensity and received by the second communication apparatus is a signal received from a communication apparatus f, and the signal having the weakest relative intensity is a signal received from the communication apparatus c. A value of "3" may be obtained as D1 from the difference between the relative intensity of the communication apparatus f and the relative intensity of the communication apparatus c.

When Equation 2 is used in accordance with another embodiment, since the signal transmitted by the communication apparatus f is the signal having the greatest intensity in FIG. 7B, the second communication apparatus may perform calculation based on the signal transmitted by the communication apparatus f. The signal difference between the communication apparatus c and the communication apparatus f is 3, the signal difference between the communication apparatus d and the communication apparatus f is 1, the signal difference between the communication apparatus e and the communication apparatus f is 2, the signal difference between a communication apparatus g and the communication apparatus f is 2, and the signal difference between a communication apparatus h and the communication apparatus f is 1, so that a total of the differences corresponds to "9."

Comparing the intensity difference information of the signals received by the first communication apparatus and the second communication apparatus shown in FIGS. 7A and 7B, the intensity difference information obtained by the first communication apparatus and the second communication apparatus based on Equation 1 is "9" and "3," respectively. In addition, the intensity difference information obtained by the first communication apparatus and the second communication apparatus based on Equation 2 is "31" and "9," respectively. The intensity information of each of the first communication apparatus and the second communication apparatus, which is obtained from at least one of Equation 1 and Equation 2, may be reflected in the status message, and the first communication apparatus and the second communication apparatus may exchange the status messages to compare the intensity difference information with each other. Large intensity difference information means that the corresponding communication apparatus is receiving a signal mainly from a specific communication apparatus, and small intensity difference information may be determined that the corresponding communication apparatus is receiving signals of other communication apparatuses uniformly. Comparing the intensity difference information of the first communication apparatus shown in FIG. 7A with the intensity difference information of the second communication apparatus shown in FIG. 7B, the intensity difference information of the second communication apparatus is less than the intensity difference information of the first communication apparatus, so that the second communication apparatus is determined that a signal can be received from the master communication apparatus and transferred to the other communication apparatuses more uniformly. Therefore, in accordance with one embodiment, the second communication apparatus may determine the second communication apparatus as the repeat node.

As described above, the operations of the first communication apparatus and the second communication apparatus are only an embodiment for determining whether the communication apparatuses are the repeat node between the communication apparatuses.

Referring to FIGS. 6A, 6B, 7A, and 7B, the repeat node may be determined on the basis of the number of signals received by the first communication apparatus and the second communication apparatus, and the repeat node may be determined on the basis of the intensity difference information of the first communication apparatus and the second communication apparatus. In accordance with one embodiment, the repeat node is first determined on the basis of an operation of determining the repeat node based on the number of signals, and when the repeat node cannot be determined on the basis of the number of signals, the repeat node may be determined on the basis of the intensity difference information of the signal. The above-described operations may be sequentially performed to determine the repeat node, and may be simultaneously performed to determine the repeat node. In addition, the signal intensity difference information shown in Equation 1 and Equation 2 is obtained in accordance with one embodiment for obtaining the signal intensity difference information, but the form and type of an operation that may obtain the intensity difference of the signal received by each communication apparatus are not limited thereto.

FIG. 8 illustrates a view for describing an operation for determining a repeat node based on a network address of a communication apparatus in accordance with one embodiment of the present disclosure.

Referring to FIG. 8, FIG. 8 shows a status message generated by each communication apparatus. Although the operations described with reference to FIGS. 6A to 7B have been performed, when the numbers of signals and the intensity difference information received by each communication apparatus are the same, each communication apparatus may determine the repeat node using the network address. As described above, each communication apparatus may be set with a MAC address, an IP address, a TCP address, or a TCP/IP address. In FIG. 8, the status message of each communication apparatus has the MAC address.

For example, when the number of signals and intensity difference information of the signal received by the first communication apparatus is equal to the number of signals and intensity difference information of the signal received by the second communication apparatus, and an address of the first communication apparatus is "00:00:00:00:10" and an address of the second communication apparatus is "00:00:00:00:01," the second communication apparatus having a low network address may be determined as a repeat node. The network address is only an identification element for specifying a location of each communication apparatus on the network, so that a user may freely set the repeat node based on the network address.

Figure 9:
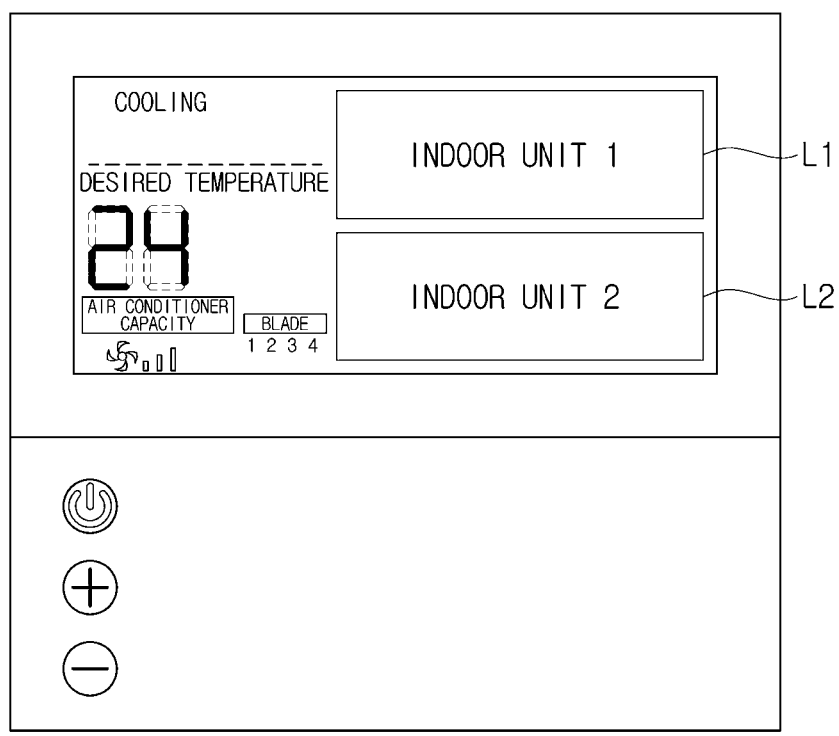
FIG. 9 illustrates a view for describing an operation for manually setting the repeat node by a user in accordance with one embodiment of the present disclosure.

FIG. 9 illustrates a view for describing an operation for manually setting the repeat node by a user in accordance with one embodiment of the present disclosure.

Although the operations described with reference to FIGS. 6A to 7B have been performed, when the numbers of signals and the intensity difference information received by each communication apparatus are the same, the repeat node may be set on the basis of the network address as described with reference to FIG. 8, or the repeat node may be determined when a user command is received.

The outdoor unit, which is connected to the plurality of indoor units and provided with the master communication apparatus, may include an inputter configured to receive the user command. FIG. 9 shows the user specifying a communication apparatus using a display and a button provided in the outdoor unit. An input scheme of the command input by the user and capable of specifying the communication apparatus is not limited to the above embodiment.

In FIG. 9, the number of signals and intensity difference information of the signal included in a status message of the first communication apparatus provided in an "indoor unit 1" match those of the second communication apparatus provided in an "indoor unit 2," so the user may input the "indoor unit 1" L1 or input the "indoor unit 2" L2 to determine the repeat node.

For example, when the user selects the "indoor unit 2" L2, the second communication apparatus provided in the indoor unit 2 is determined as the repeat node, and the second communication apparatus may receive the master signal related to the control of other indoor units from the master communication apparatus to transfer the master signal to the first communication apparatus.

Figure 10:
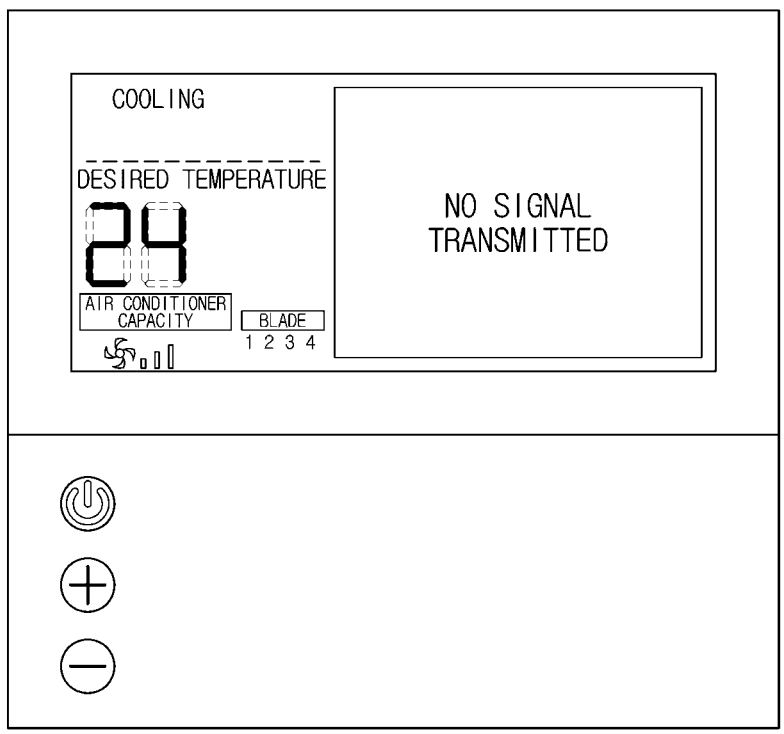
FIG. 10 illustrates a view of an error message output in accordance with one embodiment of the present disclosure.

FIG. 10 illustrates a view of an error message output in accordance with one embodiment of the present disclosure.

When a repeat node is determined on the basis of the above-described operation, the master communication apparatus may transmit a master signal configured to control other indoor units to the repeat node. When the second communication apparatus is determined as the repeat node in accordance with one embodiment, the master communication apparatus may transfer the master signal to the repeat node, and the second communication apparatus may receive the master signal to transfer the master signal to the first communication apparatus.

However, when the second communication apparatus fails to receive the master signal transmitted by the master communication apparatus, or receives the master signal but fails to transmit the master signal to the first communication apparatus, the master communication apparatus may determine the signal being failed to be transmitted, and the master communication apparatus may output an error message. In this case, the second communication apparatus has been determined as the repeat node, but may not serve as the repeat node capable of transferring the master signal transmitted by the master communication apparatus, so that the repeat node may be redetermined by repeating the above-described operation.

The form of the message which may allow the user to recognize that a specific communication apparatus selected as the repeat node may not transmit the master signal transmitted by the master communication apparatus is not limited to the above-described error message.

Figure 11:
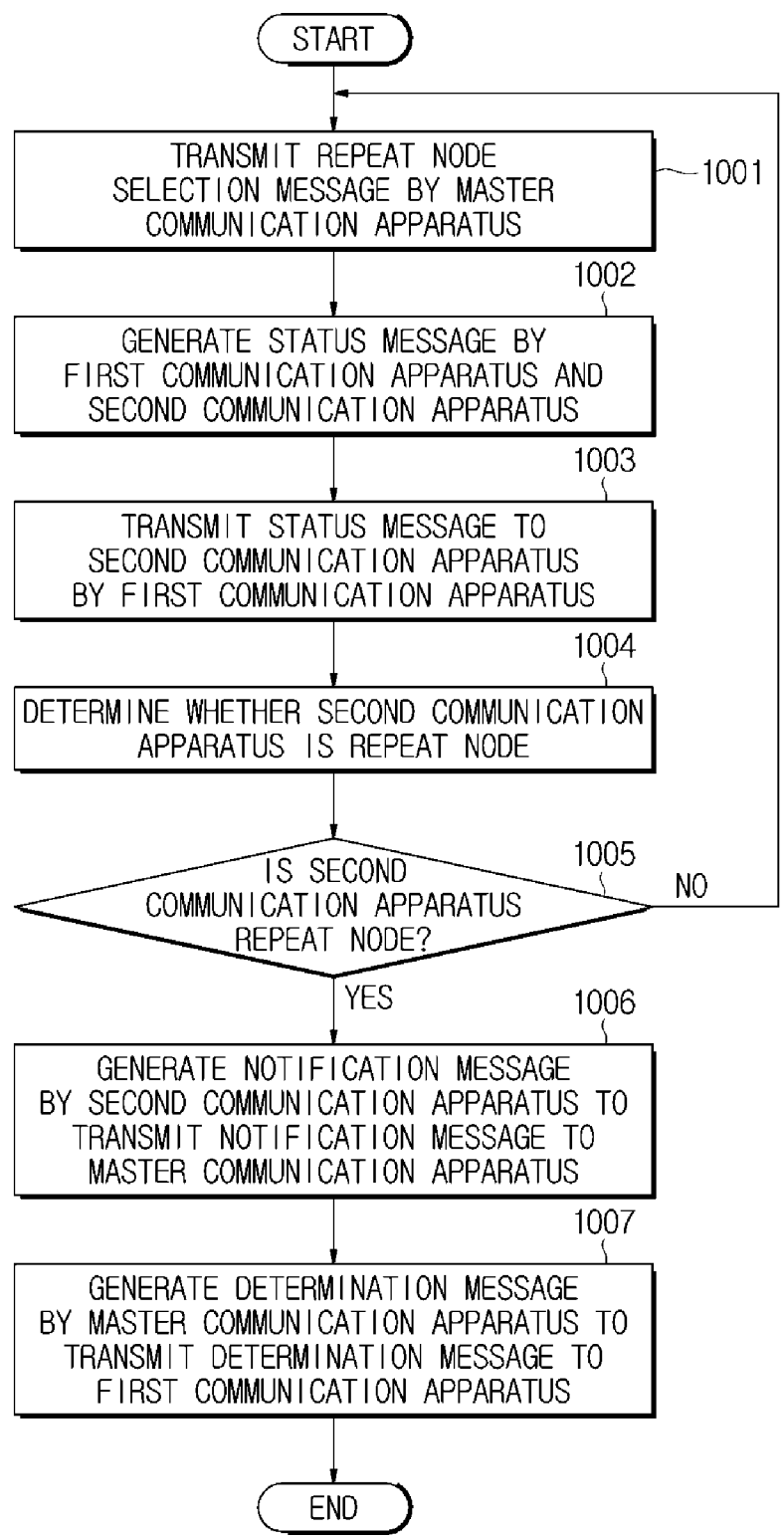
FIGS. 11 and 12 illustrate flowcharts in accordance with one embodiment of the present disclosure.
Figure 12:
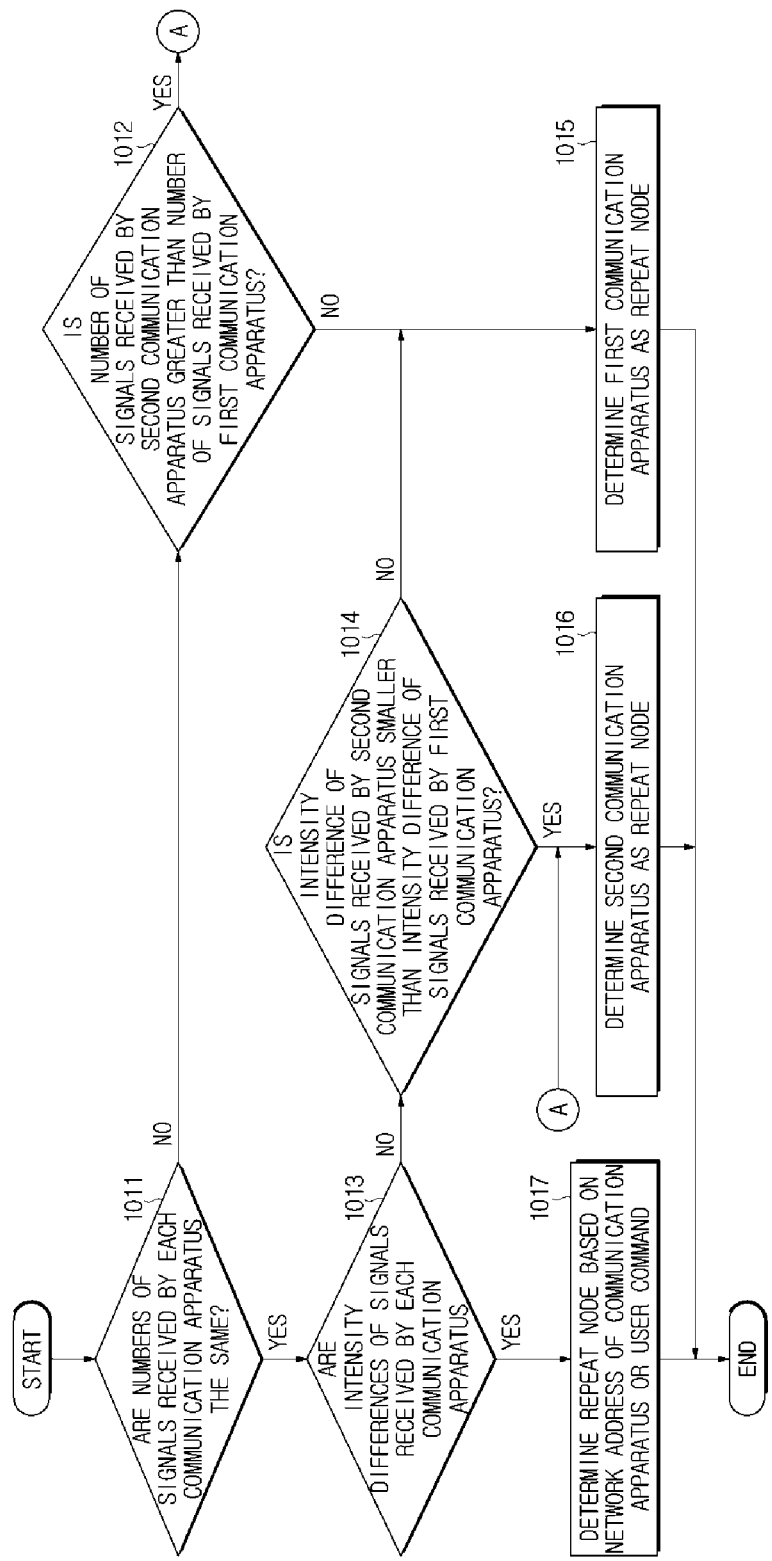

FIGS. 11 and 12 illustrate flowcharts in accordance with one embodiment.

FIG. 11 is a flowchart illustrating overall operation of the air conditioner in determining the repeat node.

Referring to FIG. 11, the master communication apparatus may transmit a message configured to select a repeat node to the air conditioner (1001). As described above, the message may be transmitted through the bus. The first communication apparatus and the second communication apparatus may generate a status message configured to determine the repeat node based on the selection message of the repeat node (1002). The status message may include a network address of each communication apparatus, the number of signals received by each communication apparatus, and intensity difference information of the signal received by each communication apparatus. The first communication apparatus may transmit the generated status message to the second communication apparatus (1003), and the second communication apparatus may determine whether the second communication apparatus is the repeat node based on the status message transmitted by the first communication apparatus (1005). When the second communication apparatus is not the repeat node, the operation of selecting the repeat node may be repeated from the beginning. When the second communication apparatus is determined as the repeat node, the second communication apparatus may transmit a notification message including information that the second communication apparatus is the repeat node to the master communication apparatus (1006). The master communication apparatus may determine that the second communication device is the repeat node when the notification message is received, and may generate a determination message to transmit the determination message to the first communication apparatus (1007). As will be described below, when the first communication apparatus has received the determination message, a signal may be received from the second communication apparatus.

FIG. 12 is a flowchart illustrating a process of determining whether the second communication apparatus is the repeat node shown in FIG. 11.

Referring to FIG. 11, the second communication apparatus may determine whether the numbers of signals received by each communication apparatus are the same based on the status message transmitted by the first communication apparatus (1011). When the number of signals received by the second communication apparatus is greater than the number of signals received by the first communication apparatus (1012), the second communication apparatus is detecting more communication apparatuses, so that the second communication apparatus may be determined as the repeat node (1016). However, when the number of signals received by the second communication apparatus is smaller than the number of signals received by the first communication apparatus, the first communication apparatus may be determined as the repeat node (1017). When the numbers of signals received by each communication apparatus are the same, the second communication apparatus may compare the intensity difference information of the signals received by each communication apparatus (1013). When the intensity difference of the signals received by the second communication apparatus is smaller than the apparatus difference of the signal received by the first communication apparatus (1014), the second communication apparatus may distribute the signal more uniformly, so that the second communication apparatus may be determined as the repeat node (1016). However, when the intensity difference of the signals received by the second communication apparatus is greater than the intensity difference of the signals received by the first communication apparatus, the first communication apparatus may be determined as the repeat node (1017).

However, when the numbers of signals received by each communication apparatus are the same, and the intensity differences of the signals received by each communication apparatus are the same, the repeat node may be determined on the basis of the network address of the communication apparatus and the user command (1015).

Meanwhile, the disclosed embodiments may be implemented in the form of a recording medium configured to store instructions executable by a computer. The instructions may be stored in the form of program code, and when the instructions are executed by a processor, a program module may be created to execute the operations of the disclosed embodiments. The recording medium may be implemented as a computer-readable recording medium.

The computer-readable recording medium includes all types of recording media in which instructions which may be decoded by a computer are stored. For example, the computer-readable recording medium may include a read only memory (ROM), a random access memory (RAM), a magnetic tape, a magnetic disk, a flash memory, an optical data storage device, etc.

As is apparent from the above description, a communication apparatus, a method of controlling the communication apparatus, and an air conditioner having the communication apparatus can implement long-distance communication by determining a repeat node configured to ensure a communication distance on an air conditioner network provided as a pipe communication device.

The disclosed embodiments have been described above with reference to the accompanying drawings. It should be understood by those skilled in the art that the present disclosure may be implemented in other forms than the disclosed embodiments without departing from the spirit and essential characteristics of the present disclosure. The disclosed embodiments are provided for illustrative purposes, and are not to be construed as limiting the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A communication apparatus comprising:
   a communicator configured to:
      receive a recognition signal from each of one or more other communication apparatuses,
      transmit a first status message generated based on the recognition signal to the one or more other communication apparatuses, and
      receive at least one second status message generated by the one or more other communication apparatuses from the one or more other communication apparatus; and
   a controller configured to:
      generate the first status message based on the recognition signal received by the communicator, and
      determine a repeat node by comparing the second status message with the first status message,
   wherein the first status message includes a number of the one or more other communication apparatuses recognized based on the recognition signal, and a first parameter representing a communication status associated with the recognized one or more other communication apparatuses, and
   wherein the second status message includes a number of one or more other different communication apparatuses recognized based on other recognition signals, that are received by the one or more other communication apparatuses from each of the one or more other different communication apparatuses, and a second parameter representing a communication status associated with the recognized one or more other different communication apparatuses.

2. The communication apparatus of claim 1, wherein the controller is further configured to determine whether the communication apparatus is the repeat node by comparing the number of the one or more other communication apparatuses included in the first status message with the number of the one or more other different communication apparatuses included in the second status message.

3. The communication apparatus of claim 1, wherein the controller is further configured to determine whether the communication apparatus is the repeat node by comparing the first parameter included in the first status message with the second parameter included in the second status message.

4. The communication apparatus of claim 1, wherein:
the first status message further includes a network address of the communication apparatus;
the second status message further includes a network address of the one or more other communication apparatuses; and
the controller is further configured to determine whether the communication apparatus is the repeat node by comparing the network address of the communication apparatus included in the first status message with the network address of each of the one or more other communication apparatuses included in the second status message when the number of the one or more other communication apparatuses included in the first status message is equal to the number of the one or more other different communication apparatuses included in the second status message, and the first parameter is identical to the second parameter.

5. The communication apparatus of claim 1, wherein the communicator is further configured to transmit and receive data to and from a master communication apparatus configured to lead communication of the communication apparatus; and
wherein the controller is further configured to:
generate a notification message to transmit the notification message to the master communication apparatus when the communication apparatus is determined as the repeat node; and
receive from the master communication apparatus a confirmation that the communication apparatus is the repeat node.

6. The communication apparatus of claim 5, wherein:
the communicator is further configured to receive data based on a user command to determine the repeat node from the master communication apparatus; and
wherein the controller is further configured to determine whether the communication apparatus is the repeat node using the data is based on the user command.

7. The communication apparatus of claim 5, wherein the controller is further configured to:
receive from the master communication apparatus a master signal when the communication apparatus is confirmed as the repeat node; and
transfer the master signal received by the communicator to the one or more other communication apparatuses.

8. The communication apparatus of claim 7, wherein the controller is further configured to:
generate an error message when the communicator fails to receive the master signal from the master communication apparatus or fails to transfer the master signal to the one or more other communication apparatuses, and transmit the error message to the master communication apparatus.

9. A method of controlling a communication apparatus, the method comprising:
receiving, by the communication apparatus, a recognition signal from each of one or more other communication apparatuses;
generating a first status message based on the recognition signal;
transmitting the first status message to the one or more other communication apparatuses;
receiving at least one second status message generated by the one or more other communication apparatuses from the one or more other communication apparatuses; and determining whether the communication apparatus is a repeat node by comparing the second status message with the first status message,
wherein the first status message includes a number of the one or more other communication apparatuses recognized based on the recognition signal, and a first parameter representing a communication status associated with the recognized one or more other communication apparatuses, and
wherein the second status message includes a number of one or more other different communication apparatuses recognized based on other recognition signals, that are received by the one or more other communication apparatuses from each of the one or more other different communication apparatuses, and a second parameter representing a communication status associated with the recognized one or more other different communication apparatuses.

10. The method of claim 9, wherein determining whether the communication apparatus is the repeat node comprises comparing the number of the one or more other communication apparatuses included in the first status message with the number of the one or more other different communication apparatuses included in the second status message.

11. The method of claim 9, wherein the determining whether the communication apparatus is the repeat node comprises comparing the first parameter included in the first status message with the second parameter included in the second status message.

12. The method of claim 9, wherein:
the first status message further includes a network address of the communication apparatus;
the second status message further includes a network address of the one or more other communication apparatuses; and
determining whether the communication apparatus is the repeat node comprises comparing the network address of the communication apparatus included in the first status message with the network address of the one or more other communication apparatuses included in the second status message when the number of the one or more other communication apparatuses included in the first status message is equal to the number of the one or more other different communication apparatuses included in the second status message, and the first parameter is identical to the second parameter.

13. The method of claim 9, further comprising:
transmitting and receiving data to and from a master communication apparatus configured to lead communication of the communication apparatus;
generating a notification message to transmit the notification message to the master communication apparatus when the communication apparatus is determined as the repeat node; and
receiving from the master communication apparatus a confirmation that the communication apparatus is the repeat node.

14. The method of claim 13, further comprising receiving data based on a user command to determine the repeat node from the master communication apparatus,
wherein determining whether the communication apparatus is the repeat node using the data is based on the user command.

15. The method of claim 13, further comprises:
receiving from the master communication apparatus a master signal when the communication apparatus is confirmed as the repeat node; and transferring the master signal to the one or more other communication apparatuses.

16. The method of claim 15, further comprising:
generating an error message when the communicator fails to receive the master signal from the master communication apparatus or fails to transfer the master signal to the one or more other communication apparatuses; and
transmitting the error message to the master communication apparatus.

17. An air conditioner comprising:
a first communication apparatus configured to generate a first status message based on a plurality of first recognition signals received by the first communication apparatus;
a second communication apparatus configured to determine whether the second communication apparatus is a repeat node by comparing the first status message transmitted by the first communication apparatus with a second status message generated based on a plurality of second recognition signals received by the second communication apparatus from the first communication apparatus; and
a bus configured to transmit a signal between the first communication apparatus and the second communication apparatus,
wherein the first status message includes a number of one or more other communication apparatuses recognized by the first communication apparatus based on the first recognition signal, and a first parameter representing a communication status associated with the recognized one or more other communication apparatuses,
wherein the second status message includes a number of one or more other communication apparatuses recognized by the second communication apparatus based on other recognition signals, that are received from each of the one or more other communication apparatuses, and a second parameter representing a communication status associated with the recognized one or more other communication apparatuses, and
wherein the first communication apparatus is configured to transmit the first status message to the second communication apparatus.

18. The air conditioner of claim 17, wherein the second communication apparatus is further configured to determine whether the second communication apparatus is the repeat node by comparing the number of the one or more other communication apparatuses included in the first status message with the number of the one or more other communication apparatuses included in the second status message.

19. The air conditioner of claim 17, wherein the second communication apparatus is further configured to determine whether the second communication apparatus is the repeat node by comparing the first parameter included in the first status message with the second parameter included in the second status message.

20. The air conditioner of claim 18, wherein:
the first status message further includes a network address of the first communication apparatus;
the second status message further includes a network address of the second communication apparatus; and
the second communication apparatus is further configured to determine whether the second communication apparatus is the repeat node by comparing the network address of the first communication apparatus with the network address of the second communication apparatus when the number of one or more other communication apparatuses included in the first status message is equal to the number of the one or more other communication apparatuses included in the second status message, and the first parameter is identical to the second parameter.

* * * * *